July 30, 1963 R. C. LENT 3,099,462
VEHICLE COUPLER OR HITCH
Filed May 17, 1962
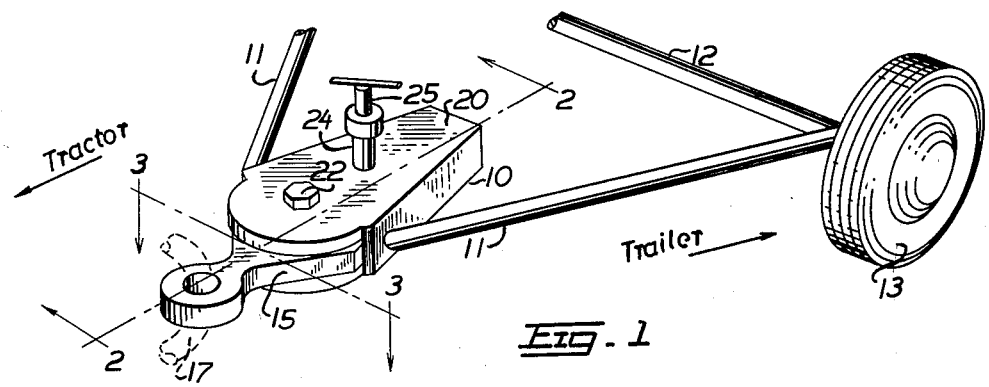
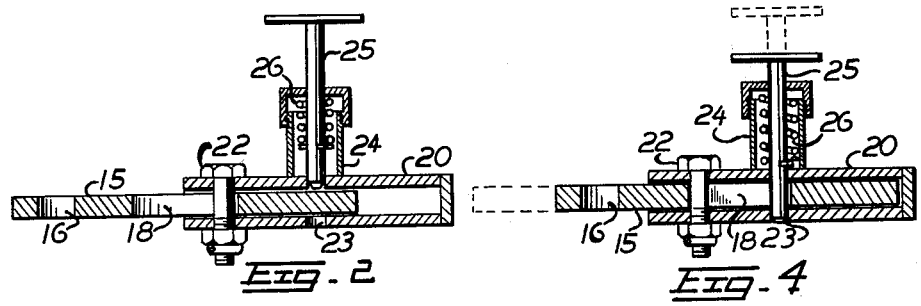
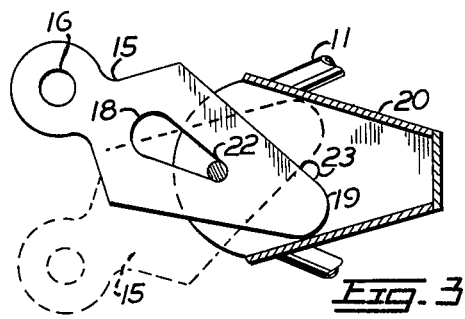
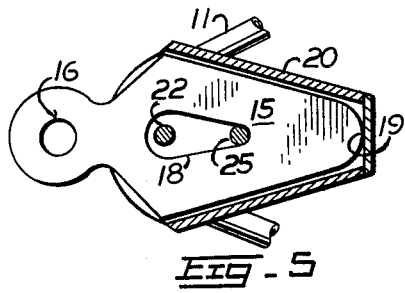
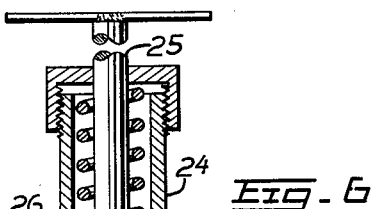
INVENTOR
Ralph C. Lent
BY Mauro & Lewis
ATTORNEYS 3,099,462
Patented July 30, 1963

1

3,099,462
VEHICLE COUPLER OR HITCH
Ralph C. Lent, Ewa, Hawaii, assignor to Hanawai Manufacturing Company, Limited, a corporation of Hawaii
Filed May 17, 1962, Ser. No. 195,541
1 Claim. (Cl. 280—478)

This invention relates to a vehicle coupler or hitch particularly adaptable for use in attaching a towed vehicle or trailer to a prime mover or tractor.

The conventional tractor equipped for towing has a hook, pin or ball mounted in fixed position at its rear, over which the trailer coupler, usually in the form of an eye or ring, must be placed for towing. This arrangement requires that the tractor must be maneuvered precisely with respect to the trailer so that the tow hook comes directly under the tow ring in the right position to effect the coupling. Usually the services of at least one helper in addition to the tractor operator are required for this operation, which is especially tedious when the trailer is too heavy to be moved or shifted manually.

According to the present invention, a trailer hitch is provided which has an extensible, laterally movable towing eye or coupling. This allows the trailer to be connected to the tractor when the hook carried by the latter is merely in the vicinity of the hitch and not in good alignment. After the coupling is effected, further means are provided in the hitch whereby the coupling is retracted and locked into rigid condition for towing, merely by backing the tractor.

When the trailer is unhooked, the same adjustable means in the coupling can be used to eliminate jamming or binding between the tow hook and the eye of the hitch.

Further features of the invention will be explained in connection with a description of the drawing, wherein:

FIG. 1 is a fragmentary perspective view of the invention;

FIG. 2 is a sectional view through the hitch on lines 2—2 of FIG. 1, showing the coupler means in extended or adjustable position;

FIG. 3 is a sectional view taken on lines 3—3 of FIG. 1, showing the coupler means in the same condition as in FIG. 2;

FIG. 4 is a view similar to FIG. 2, showing the hitch in locked position;

FIG. 5 is a view similar to FIG. 3, also showing the hitch in locked position; and FIG. 6 is an enlarged vertical section of the locking pin of the invention.

In FIG. 1, the hitch according to the invention is shown generally at 10, mounted on the shafts 11 leading to the rear axle 12 of a trailer, one wheel of which is shown at 13. Shafts 11 are pivotally movable with respect to axle 12 by the provision of suitable joints (not shown).

As best seen in FIGS. 2–5, the coupler member 15 is formed with an elongated wedge-shaped body tapering to the rear, the front portion having a coupling eye 16 for engagement with the hook 17 (FIG. 1) of a tractor. Member 15 is also provided with an elongated tapered slot whose location and configuration is best seen at 18, FIGS. 3 and 5. The rear of member 15 is rounded at 19.

Member 15 is mounted in a hollow socket member 20 attached as by welding to the trailer shafts 11. The top, bottom, side and end walls of member 20 may be formed

2 of welded metal strips shaped to give the socket interior dimensions roughly complementary to the shape of the tapered body of coupling 15, the latter fitting therein with a close but sliding fit. The relative dimensions are such that member 15 cannot jam within socket 20: rear portion 19 of member 15 will engage the rear wall of member 20 before this occurs.

The front portion of socket 20 is vertically bored to receive a connecting pin or bolt 22 which passes through the slot 18 in member 15, retaining the latter in the socket with relative movement limited by the shape and size of slot 18. Socket 20 is also provided with bores or holes 23 centrally of the socket, spaced inwardly from the socket mouth and spaced apart from the bolt 22 by a distance slightly less than the length of slot 18.

Above the bore 23 is mounted a screw-top housing 24 carrying the locking pin 25 in position for entry into bore 23, thus passing through the rear of the slot 18 when the latter is in register with bore 23, as shown in FIGS. 4–5. Pin 25 is spring-urged to take this locked position by the action of spring 26 carried internally of housing 24.

It will be seen that the location of slot 18 in coupler 15 with respect to that of pin 25 is such that the latter will enter the rear of the slot 18 and lock coupler 15 only when the latter's body portion has been substantially completely retracted into socket 20.

Operation

To operate the device, a tractor or the like, carrying a pin or hook such as hook 17, FIG. 1, is backed to the trailer with hook 17 in the general vicinity of the eye 16 of hitch 10. Pin 25 is then raised. In this condition, as shown in FIGS. 2–3, the coupler may be pulled out of the socket 20 and/or swung sideways (dotted lines, FIGS. 3 and 4) to the extent necessary for eye 16 to be engaged over hook 17. Then by reversing the tractor, coupler 15 may be forced back into retracted position in socket 20 until locking pin 25 engages the rear of the slot 18 and snaps down into the locked position shown in FIGS. 1, 4, and 5. During this movement the rounded tip 19 of coupler 15 will deflect along the side walls of socket 20 until the position of FIG. 5 is assumed.

When the trailer is to be uncoupled, release of the coupler 15 by raising pin 25 will remove any stress between the vehicles which may cause the tractor hook to bind or jam in the coupler member.

While the invention has been shown or described in the form of a trailer hitch, various other applications of the invention will be apparent to those skilled in the art.

What is claimed is:

In a coupler device of the type described for attaching one vehicle to another vehicle, a socket member having means for its attachment to one of said vehicles, said socket member having a fully enclosed interior tapering from a relatively small rear portion to a relatively wide mouth, a coupler member having a forward portion supplied with means for its attachment to said other vehicle, said coupler member having a tapered rear portion of dimensions substantially complementary to those of said socket interior, said rear portion of said coupler member being further provided with a single elongated slot extending along part of the central longitudinal axis of said coupler member, connecting means between said coupler member and said socket member comprising a connecting pin secured through at least one wall of said socket member in a position to enter into said elongated slot adjacent the forward end thereof when said tapered portion of said coupler member is fully retracted within said socket member, and a spring urged locking pin likewise secured through at least one wall of said socket member in a position to enter into said elongated slot adjacent the rear end of said slot only when said tapered rear portion of said coupler member is fully retracted within said socket member, deactivation of said locking pin allowing withdrawal of said coupler member from said socket member to the extent permitted by the length of said elongated slot, in said withdrawn position said connecting pin furnishing a pivot in the rear of said slot affording lateral movement of said coupler member to the extent permitted by the walls of said socket member.

References Cited in the file of this patent
UNITED STATES PATENTS

| | | |
|---|---|---|
| 2,820,649 | Demarest | Jan. 21, 1958 |
| 2,845,281 | Holder et al. | July 29, 1958 |

FOREIGN PATENTS

| | | |
|---|---|---|
| 388,628 | Great Britain | Mar. 2, 1933 |